United States Patent
Reichel et al.

(10) Patent No.: US 10,006,580 B2
(45) Date of Patent: Jun. 26, 2018

(54) LINING HOSE FOR RENOVATING FLUID-BEARING PIPE SYSTEMS

(71) Applicant: SML Verwaltungs GmbH, Rohrbach (DE)

(72) Inventors: Stefan Reichel, Bad Duerkheim (DE); Christian Noll, Limbergerhof (DE)

(73) Assignee: SML VERWALTUNGS GMBH, Rohrbach (DE)

( * ) Notice: Subject to any disclaimer, the term of this patent is extended or adjusted under 35 U.S.C. 154(b) by 0 days. days.

(21) Appl. No.: 15/027,295

(22) PCT Filed: Oct. 5, 2014

(86) PCT No.: PCT/EP2014/071276
§ 371 (c)(1),
(2) Date: Apr. 5, 2016

(87) PCT Pub. No.: WO2015/052101
PCT Pub. Date: Apr. 16, 2015

(65) Prior Publication Data
US 2016/0245448 A1    Aug. 25, 2016

(30) Foreign Application Priority Data
Oct. 8, 2013  (DE) .................. 10 2013 111 094

(51) Int. Cl.
| | |
|---|---|
| *F16L 55/16* | (2006.01) |
| *F16L 55/165* | (2006.01) |
| *B32B 5/02* | (2006.01) |
| *B32B 7/12* | (2006.01) |
| *B32B 27/12* | (2006.01) |

(Continued)

(52) U.S. Cl.
CPC ............ *F16L 55/1656* (2013.01); *B32B 1/08* (2013.01); *B32B 5/024* (2013.01); *B32B 7/12* (2013.01); *B32B 27/12* (2013.01); *B32B 27/16* (2013.01); *B32B 27/32* (2013.01); *B32B 27/34* (2013.01); *B32B 2260/021* (2013.01); *B32B 2260/046* (2013.01); *B32B 2307/308* (2013.01);
(Continued)

(58) Field of Classification Search
CPC .......................... F16L 55/1656; F16L 55/1651
USPC ........ 138/97, 98, 125, 146; 405/150.1, 184.3
See application file for complete search history.

(56) References Cited

U.S. PATENT DOCUMENTS

| | | |
|---|---|---|
| 5,798,013 A | 8/1998 | Brandenburger |
| 6,679,966 B1 | 1/2004 | Brandenburger |

FOREIGN PATENT DOCUMENTS

| | | |
|---|---|---|
| DE | 10 2011 105 592 | 12/2012 |
| EP | 0 393 304 | 10/1990 |

(Continued)

OTHER PUBLICATIONS

International Search Report and Written Opinion (translation)received in connection with international application No. PCT/EP2014/071276; dated Dec. 15, 2014.

*Primary Examiner* — Patrick F Brinson
(74) *Attorney, Agent, or Firm* — The Marbury Law Group, PLLC

(57) ABSTRACT

Lining hose for renovating fluid-bearing pipe systems with at least one curable layer, wherein this at least one curable layer comprises at least on resin-impregnated fiber belt (fiber ribbon) and a first outer tubular foil, which is arranged on the curable layer on the surface opposite to the surface facing the fluid medium transported and which first outer tubular foil is equipped with a reinforcing element on both surfaces (Continued)

of the tubular foil and which is impregnated with resin on both surfaces.

12 Claims, 1 Drawing Sheet

(51) Int. Cl.
*B32B 27/16* (2006.01)
*B32B 27/32* (2006.01)
*B32B 27/34* (2006.01)
*B32B 1/08* (2006.01)

(52) U.S. Cl.
CPC ....... *B32B 2597/00* (2013.01); *F16L 55/1652* (2013.01); *F16L 55/1653* (2013.01)

(56) References Cited

FOREIGN PATENT DOCUMENTS

| WO | WO 95/04646 | 2/1995 |
|----|-------------|--------|
| WO | WO 00/73692 | 12/2000 |

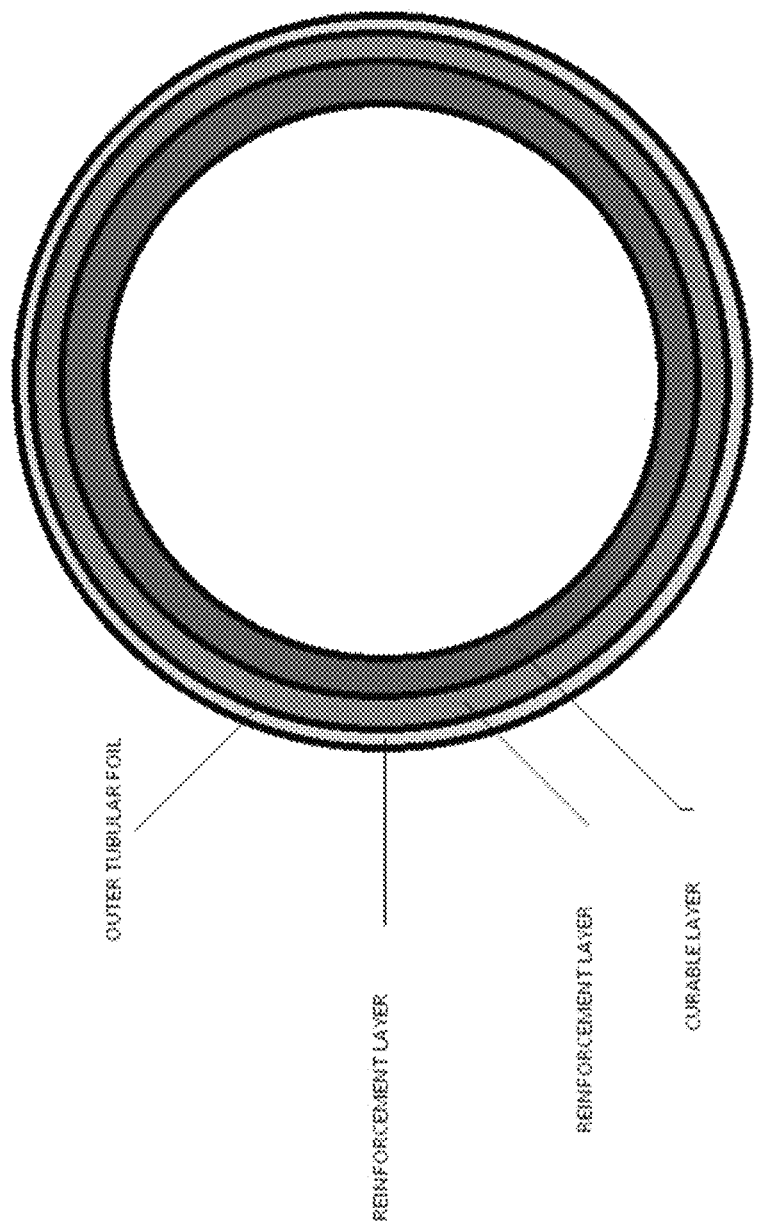

LINING HOSE FOR RENOVATING FLUID-BEARING PIPE SYSTEMS

The present invention relates to a liner tube (hereinafter referred to as lining hose), a process for the manufacture of such lining hose and the use of such lining hose.

Processes for the rehabilitation (renovation) of pipe (conduit) systems, in which e.g. liquid or gaseous media are transported are known in the state of the art and have been described repeatedly.

As an example, processes may be mentioned wherein segments of the line which comprise defects or which are damaged are replaced by new line segments. However, this is laborious and not always possible. Furthermore, processes are known in the state of the art in which, for the rehabilitation of sewer lines or similar conduit systems, a flexible fiber hose impregnated with a hardenable (curable) resin, which is commonly referred to as lining hose or liner, is introduced into the conduit system. After introduction of the lining hose, same is expanded to fit snugly or adapt to the inner wall of the conduit system. Thereafter the resin is cured (hardened).

The manufacture of such a lining hose is described e.g. in WO 95/04646. Such lining hose usually comprises an outer protective foil impervious (opaque) to light, an inner foil being transparent for light of at least certain wavelength ranges and a fiber ribbon impregnated with resin, which is located between said inner foil and said outer foil.

From WO 00/073692 a lining hose is known, which comprises an inner tubular foil, a fiber ribbon impregnated with resin and an outer tubular foil, which is laminated (lined) on its inner surface to a fiber non-woven.

In many cases, in the course of manufacturing a lining hose, the resin impregnated tubular fiber foil (fiber hose) is coiled (wound) onto the inner tubular foil in the form of a helix (spiral) in an overlapping manner. The outer tubular foil thereafter is also coiled (wound) in the form of a helix (spiral) in an overlapping manner around the resin-impregnated fiber hose.

After curing the lining hoses in the conduit same have to be as leak-tight as possible.

It was therefore an object of the present invention to provide lining hoses for the rehabilitation (renovation) of fluid-conducting pipe (conduit) systems which do not show the disadvantages of the state of the art and which provide lining hoses with good leak-proof properties.

This object is achieved with a lining hose with at least one curable layer, wherein this at least one curable layer comprises at least one resin-impregnated fiber belt (fiber ribbon) and a first outer tubular foil (hose), which is arranged on the curable layer on the surface opposite to the surface facing the fluid medium transported and which first outer tubular foil is equipped with a reinforcing element on both surfaces of the tubular foil and is impregnated with resin on both surfaces.

As a result of the resin impregnation of both surfaces of this first outer tubular foil (hose) a good connection between the outer tubular foil and the layer of resin-impregnated fiber belts (ribbons) is achieved.

Furthermore, the leak-tightness of the entire system is improved through the reinforcement of both sides (surfaces) of the outer tubular foil. Through the resin-impregnation of both surfaces a double barrier in both directions is created, which effect is then reinforced through the curing of the resin.

Furthermore, through the resin-impregnated reinforcement on the surface opposite to the fiber belts, the bonding of additional foils, which may be present in accordance with preferred embodiments, is also improved.

The term tubular foil or hose, (e.g. outer tubular foil or hose), for the purpose of the present invention, is intended to cover pre-fabricated tubular foils, planar foils (films) which form a hose or a tube after connecting their rims or borders, or coiled (wound) arrangements of foils or fiber belts. After installing into the pipe (conduit) system to be renovated (rehabilitated) and subsequent curing all these embodiments form substantially cylindrical elements in tubular form.

The reinforcing element which is used for the tubular foil reinforced (armed) on both surfaces may be a reinforcing element known per se. By way of example, non-woven fabric reinforcements (fleeces), felts, fabrics or rovings may be mentioned here, wherein non-woven fabric reinforcements (fleeces) have proven to be advantageous in a number of cases.

Principally any product known to the skilled person in the form of fabrics, knitted fabrics, rovings, mats or non-wovens (fleeces) which may comprise fibers in the form of long endless fibers or short fibers, are suitable. Respective products are known to the skilled person and are commercially available in great variety from different producers and suppliers.

The term fabric (textile) generally denotes sheet-like textile products of at least two orthogonally crossed fiber systems, wherein the so-called warp extends in the longitudinal direction and the so-called weft (shute) extends in a direction orthogonal thereto.

The term knitted fabric generally denotes textile products produced through the formation of meshes.

Fiber rovings or rovings are a processing variant of fibers, in which the fibers are not woven, but oriented parallel to each other embedded in a chemical carrier compound (the matrix) and which are fixed in place usually through cover foils on the upper and the lower surface. Rovings, due to the parallel orientation of the fibers usually show a pronounced anisotropy of stiffness or rigidity in the direction of the orientation and perpendicular thereto, which may be of interest for certain applications.

A non-woven or fleece consists of fibers loosely laid next to each other without being connected. The rigidity of a fleece solely rests on the fiber-inherent attraction, but may be influenced through further processing. In order be able to use and process a non-woven (fleece) same is usually solidified, for which solidification several methods may be used.

Fleeces differ from textiles (fabrics) or knitted fabrics, which are characterized by a particular and defined layering of the single fibers or filaments. Fleeces, in contrast, consist of fibers the orientation of which can only be described with statistical methods. The fibers are randomly oriented in the fleece. The English term non-woven thus clearly differentiates fleeces from textiles. Fleeces are differentiated according to the fiber material (e.g. the polymer in case of chemical fibers), the bonding process, the fiber type (staple or endless fibers), the denier of the fibers and the fiber orientation. The fibers may be oriented in a preferred direction or may be entirely stochastically oriented in the randomly oriented fleece.

If the fibers do not have a preferred direction for their orientation, the term isotropic fleece is used. If the fibers are oriented in one direction more often than in another direction, the term anisotropy is used.

Felts are also suitable as reinforcement for the tubular foil reinforced on both surfaces (sides). A felt is a sheet-like product based on unsorted and difficult to separate fiber material. In principle, felts are thus in principle textiles which are not woven: Felts are usually obtained from chemical fibers or natural plant-based fibers through dry needling (so called needled felts) or through solidification with water beams which exit from a beam with dies (die beam) under high pressure. The individual fibers in a felt are interlooped with each other in a random manner.

Needled felts are usually mechanically manufactured with a multiplicity of needles with flukes (barbs), wherein the barbs or flukes are positioned in reverse direction compared to a harpoon. Thereby, the fibers are pressed into the felt and the needle can be easily pulled out. Through repeated stitching the fibers are looped (entangled) with each other and thereafter optionally treated chemically or with water vapor.

Felts—as fleeces—may be manufactured from basically all natural or synthetic fibers. Besides needling or in addition to needling the fibers is also possible to hook the fibers with a pulsed water beam or a binding agent. The latter methods are in particular suitable for fibers without scale structure such as polyester or polyamide fibers Felts show a good temperature stability and are usually hydrophobic, which may be an advantage for the application in fluid-carrying systems.

The length of the fibers used in fiber-containing reinforcing elements is not subject to a particular limitation, i.e. so-called long fibers as well as short fibers or fiber fragments may be used. The length of the fibers may be used to adjust and control the properties of the respective fiber belts (ribbons) over a wide range.

The type of fibers used is not subject to particular limitations either. Only by way of example glass fibers, carbon fibers or polymer fibers such as aramide fibers or fibers based on thermoplastic polymers such as polyesters or polyamides or polyolefins (e.g. polypropylene) shall be mentioned here, which are known to the person skilled in the art with their properties and which are commercially available in great variety. For economic reasons, glass fibers are usually preferred; if e.g. a particular heat resistance is of importance, however, aramide fibers or carbon fibers may be used, which may offer advantages compared to fibers based on thermoplastic polymers as far as rigidity or stiffness at higher temperatures is concerned.

The plastics (polymer) material for the foils reinforced (armed) on both surfaces is not subject to a particular limitation and the skilled person will select a suitable foil material depending on the intended application purpose. It is advantageous if the foil has a barrier effect against resin or resin components (e.g. solvents) contained in the resin-impregnated fiber belts or ribbons. Suitable foil materials are known to the skilled person and have been described in the literature. Only by way of example polyolefin foils (films) or composite foils (films) of polyolefins and polyamides may be mentioned here, which have a good barrier effect against styrene which is often used as solvent in the resins used for the impregnation.

The bonding of the reinforcement on both sides (surfaces) with the foil (film) may be effected in a manner know per se, e.g. thermally through welding or laminating or with the use of suitable glues. It is important to have a bonding which is sufficiently stable to avoid a separation or delamination during the manufacture of the lining hose.

Particularly preferred the reinforcement of the foil reinforced on both sides (surfaces) is a laminated non-woven or fleece.

When used hereinafter, the term fleece layer or non-woven layer shall be understood to comprise one or more than one non-wovens (fleeces), i.e. each fleece layer may consist of one or more fleeces. One fleece per fleece layer is preferred, however.

In addition to the essential outer tubular foil reinforced on both surfaces (sides) the lining hoses in accordance with the present invention may comprise further foils (films), which may be reinforced or not. Thus, e.g on the side (surface) of the tubular foil reinforced on both surfaces opposite to the surface oriented (facing) towards the curable fiber belts, one or more additional foils (films) may be present, which may be unreinforced, reinforced on one surface or reinforced on both surfaces (sides).

Furthermore, it is possible to arrange a reinforcing layer on the surface (side) of the foil facing towards the curable fiber belts and reinforced on both surfaces.

By virtue of such a third reinforcement the leak-tightness of the entire system is improved as, as a result of the third, in particular resin-impregnated, reinforcement on the surface oriented towards the resin impregnated fiber belts, it is not necessary to spare margin strips in the course of bonding (connecting) the border (margin) areas.

In accordance with a preferred embodiment of the invention, it may be envisaged to have at least one further outer tubular foil arranged on top of the first outer tubular foil, wherein the further outer tubular foil or the further outer tubular foils may be reinforced on one or both sides (surfaces), in particular laminated with a fleece layer (nonwoven reinforcing material). In such a case the first outer tubular foil correctly should not be designated as outer foil but rather as foil located on the outer side, wherein located on the outer side would denote the fact that the tubular foil is located on the side (surface) opposite to the surface of the fiber belts facing the fluid medium.

For the purposes of the present invention the term "outer tubular foil" is principally used for tubular foils which, after insertion of the lining hose in the conduit (pipe) system to be renovated (rehabilitated), are positioned on the surface of the resin-impregnated fiber belts opposite to the surface facing the fluid medium flowing in the conduit system. If several of such tubular foils are present, the respective tubular foil will be more specifically characterized (specified) with reference to its position and arrangement.

Additional tubular foils are advantageous for further increasing the leak-tightness. In particular for the leak-tightness in the border areas of the first outer tubular foil (reinforced on both surfaces) of the lining hoses in accordance with the present invention this may be advantageous in many cases.

In case of use of optionally reinforced additional tubular layers, at least one of the reinforcements of two tubular foils which are in contact with each other is impregnated with resin. Impregnation of one reinforcement in case of two reinforcement being in contact with each other is usually sufficient to achieve an impregnation or soaking of the second reinforcing layer, which is advantageous for the bonding of the reinforcements to each other (and thereby of the tubular foils) and also for the leak-tightness after curing.

Only the outermost layer, which forms the outer border of the lining hose which separates the lining hose from the surrounding atmosphere (which is usually the soil in sewer systems) should be designated as truly "outermost" tubular foil.

In accordance with an embodiment of the present invention it may be envisaged that border areas (these are the marginal areas) of the at least one first and/or the at least one further plastic foils are offset against each other which may e.g. be achieved by helically winding (coiling) of the tubular foils. This can be advantageous for the leak-tightness of the lining hoses in accordance with the present invention after curing.

It may also be envisaged that the first and/or second plastic (polymer) foil comprises at least one thermoplastic polymer or consists thereof, in particular if it comprises or forms a polyolefin foil, a polyamide foil are a composite foil (film) of polyolefins and polyamides.

Thermoplastic polymers have proved as advantageous as the reinforcing layers may be at least partially molten into the thermoplastic polymers (thermoplastic polymers are repeatedly processible over the molten aggregate form) which leads to an increase in the stability of the lining hose. A polyethylene foil provides in this context desired processing advantages. A polyamide foils has the benefit that it may constitute a diffusion barrier and thereby the emission of undesired compounds of the lining hose, in particular of styrene, to the environment may be prevented or minimized.

The thickness of the various reinforcement layers, preferably non-woven (fleece) layers is not subject to a particular restriction. In certain cases, a thickness in the range of from 10 to 1000 μm preferably of from 20 to 500 μm, particularly preferred of from 25 to 150 μm and/or a mass per unit area in the range of from 10 to 300 grams per square meter, preferably of from 15 to 200 grams per square meter, particularly preferred of from 20 to 80 grams per square meter has proved to be advantageous. In some cases thicknesses in the range of from 40 to 90 μm have shown advantages.

Resins suitable for the impregnation of the various layers of the lining hoses in accordance with the invention are all resins known to the skilled person for this purpose which have been described in the literature or products which are commercially available. By way of example unsaturated polyester resins, vinyl ester resins or epoxy resins may be mentioned which have been described in the literature in great variety and which are commercially available.

It may be envisaged not to reinforce the border areas of two polymer foils in contact with each other, in particular if the two polymer foils have different melting ranges, as this may improve the bonding or connecting of the border areas of such foils through thermal processes.

On top of the outer tubular foils described hereinbefore usually at least one opaque (not transmitting light) protective foil is arranged, which may also contain one layer functioning as diffusion barrier and which protects the lining hose from damages or premature curing during transport. This layer or foil remains in the conduit system if the lining hose is inserted into the conduit system to be renovated by pulling without inversion. If the lining hose is introduced into the conduit system to be renovated, this protective foil becomes an inner layer after insertion and is removed after insertion but before curing as curing through radiation is not possible due to the lack of transmissibility of this foil for the light used for radiation.

In another embodiment the lining hose may comprise one or more inner protective foils, in particular in the form of polymer foils, on the side (surface) of the curable layer (comprising one or more fiber belts) facing the fluid medium. Respective foils are known to the person skilled in the art and have been described in the literature so that no further details need to be given here.

Between this protective foil and the layer of at least one fiber belt (ribbon) further reinforcement layers or armed tubular foils may be arranged. Again, respective products are known to the skilled person and have been described in the literature so that no further details need to be given here.

In accordance with a preferred set-up, a tubular foil reinforced on both sides may be positioned between the inner protective foil and the layer of fiber belts, which provides additional protection from the abrasive forces of components which may be present in the flowing fluid medium and which in addition prevents the leaking out of the flowing medium from the lining hose to the outside. The reinforcement of this tubular foil may be impregnated with resin on one or both surfaces to achieve a better bonding to the curable fiber belts. Between the inner foil and the foil reinforced on both sides described above an additional reinforcing layer consisting of a non-woven or a fleece or the like may be present, which may be impregnated with resin too, A further object of the present invention is a process for the manufacture of a lining hose, in particular for the manufacture of a lining hose in accordance with the present invention, comprising the following steps, in particular in this sequence:

a) providing at least one, in particular tubular, inner foil,
b) helical and overlapping winding of at least one fiber belt impregnated with resin to form at least one curable layer on the at least one inner foil, in particular through the use of a winding mandrel,
c) helical and overlapping winding, in particular with the use of a winding mandrel, and/or laying around of a first outer tubular foil, onto the at least one curable or curing layer wherein the first outer tubular foil comprises at least one first polymer foil reinforced on both sides and wherein the reinforcing layers are impregnated with resin.

In accordance with an embodiment of the process of the present invention resin-impregnated fiber belts as at least one curable layer are formed into a tubular body which is then surrounded by at least one first outer tubular layer.

As an example, a resin impregnated fiber belt is wound around an inner tubular foil which has been pulled on a winding mandrel and thereafter the first outer foil (or more correctly the first foil located on the outer side) is placed on the outer side. The first outer foil is positioned through winding and/or through laying around or pulling on of an outer tube having a reinforcement on both sides.

By off-setted helical and overlapping winding and/or laying around the various layers of the lining hoses in accordance with the present invention it may be achieved that the border areas of two neighbored tubular foils are offset, which may be advantageous for the leak-tightness of the lining hose after curing.

The insertion of the lining hose into a section of the conduit system which needs rehabilitation can be achieved directly, e.g. with a winch or by invaginating an inversed liner with pressured air or through pressing in of waterwater. This is in particular useful if—as in a preferred embodiment of the invention—house connections or branch lines extending from a main sewer line are the subject of renovation as e.g. described in U.S. Pat. No. 6,227,764. Due to the usually smaller diameter of these systems and the frequent turnings pulling-in procedures are frequently facing difficulties and so called inverting procedures have advantages. Inversion processes are known to the skilled person and have been described in the literature so that no further details need to be given here.

The lining hose is thereafter, e.g. with pressured air, expanded so that same snugs to the inner wall of the pipe to be renovated.

After insertion of the lining hose into the fluid-conducting pipe system the lining hose is cured in a manner known per se, for which the skilled person will select the suitable curing process dependent on the resin selected. Respective processes are known to the skilled person and have been described in the literature so that no further details need to be given here.

A further object of the present invention is the use of the lining hoses in accordance with the present invention for the renovation (rehabilitation) of fluid-conducting pipe systems (conduit systems).

For the purpose of the present invention, the term conduit system or pipe systems is to be understood as encompassing any pipe system or conduit system for the transportation of liquid or gaseous media, which may be operated at sub-atmospheric pressure, at atmospheric pressure or at pressures exceeding atmospheric pressure. By way of example, pipelines of any type, pipe systems for the transport of media in chemical plants and production sites, pressure pipes such as pressured water lines or drinking water lines and in particular wastewater systems may be mentioned here which are laid underground respectively in a non-visible manner.

Finally, the present invention provides a lining tube of at least one cured lining hose in accordance with the present invention in particular inserted or arranged inside in a pipe or a conduit to be rehabilitated (renovated).

The lining hoses in accordance with the present invention are suited for the renovation (rehabilitation) of fluid carrying conduit systems of any type. By way of example different types of sewer and other wastewater systems as well as pipeline systems in industrial production plants may be mentioned. The lining hoses in accordance with the invention allow the rehabilitation of pipe systems without the necessity of excavating the conduit system as such, which in particular in case of pipe systems which are only accessible with difficulties, facilitates the use and leads to a significant cost reduction as e.g. laborious digging works to a major extent are unnecessary. This is in particular advantageous in the rehabilitation of sewer systems in cities, because the no-dig rehabilitation far less detrimentally influences the ongoing traffic compared with the traditional rehabilitation by digging.

The lining hoses in accordance with the invention show a particularly good leak-tightness, which is in particular beneficial in applications where the conduit systems to be renovated (rehabilitated) are in protected areas or areas which should be protected.

After curing the lining hose in the conduit system, same should be as leak-tight as possible. In a leak tightness test in accordance with DIN EN 1610 (1997), Chapter 13.2., procedure L (test with air) a pressure loss in accordance with the state of the art at a pressure of 200 mbar and a testing time in the range of from 1.5 to 5 minutes depending on diameter respectively thickness a pressure drop of 15 mbar at maximum is allowed. This pressure drop corresponds to a leak-tightness of the lining hoses satisfactory for many areas of application.

There are, however, areas of applications for lining hoses are known which require an even better leak-tightness. Thus, in pressured pipes, stricter requirements are demanded as air may leak out or water may intrude through capillaries in the tube and/or at the overlapping areas of the outer foil. The lining hoses in accordance with the invention are useful also in these application areas.

The invention claimed is:

1. Lining hose for renovating fluid-bearing pipe systems with at least one curable layer and a first outer tubular foil,
    wherein the at least one curable layer comprises: at least one resin-impregnated fiber belt (fiber ribbon) having a surface facing a fluid medium being transported, and
    wherein the first outer tubular foil, is arranged on the curable layer on a surface opposite to the surface facing the fluid medium being transported and
    wherein the first outer tubular foil, comprising opposing surfaces, is equipped with a reinforcing element on both surfaces and is impregnated with resin on both surfaces.

2. Lining hose in accordance with claim 1, wherein the reinforcing element is a non-woven, a fleece, a fabric, or a roving.

3. Lining hose in accordance with claim 1, wherein the reinforcing element is a laminated non-woven.

4. Lining hose in accordance with claim 1, wherein a further tubular foil or foils is/are present which may be reinforced or not reinforced, and the further tubular foil or foils is/are arranged on a surface of the first outer tubular foil.

5. Lining hose in accordance with claim 2, wherein a further tubular foil or foils is/are present which may be reinforced or not reinforced, and the further tubular foil or foils is/are arranged on a surface of the first outer tubular foil.

6. Lining hose in accordance with claim 3, wherein a further tubular foil or foils is/are present which may be reinforced or not reinforced, and the further tubular foil or foils is/are arranged on a surface of the first outer tubular foil.

7. Lining hose in accordance with claim 4, wherein the further tubular foil or foils is/are reinforced on opposing surfaces.

8. Lining hose in accordance with claim 1, comprising a reinforcing layer on the surface of the first outer tubular foil facing toward the curable fiber belts.

9. Lining hose in accordance with claim 8, comprising a further outer tubular foil positioned on the first outer tubular foil.

10. Lining hose in accordance with claim 5, wherein the further tubular foil or foils is/are reinforced on opposing surfaces.

11. Lining hose in accordance with claim 6, wherein the further tubular foil or foils is/are reinforced on opposing surfaces.

12. Lining hose in accordance with claim 1, further comprising one or more inner protective foils on the surface of the curable layer facing the fluid medium.

* * * * *